United States Patent Office 3,806,505
Patented Apr. 23, 1974

3,806,505
AMINO PROPYL TETRAHYDRO-1,4-OXAZINES
Mauvernay Roland-Yves, Riom, Busch Norbert, Loubeyrat, Simond Jacques, Chamalieres, and Moleyre Jacques, Mozac, France, assignors to Centre Europeen de Recherches Mauvernay C.E.R.M.
No Drawing. Original application July 16, 1969, Ser. No. 842,388, now Patent No. 3,663,566. Divided and this application Dec. 29, 1970, Ser. No. 102,526
Claims priority, application France, July 17, 1968, 159,466
Int. Cl. C07d 87/42
U.S. Cl. 260—247.2 A          8 Claims

ABSTRACT OF THE DISCLOSURE

An amide of the formula

R—O—CH$_2$—CH—CH$_2$—A
        |
        NH—CO—R$_1$ in which R is lower alkyl having up to 5 carbon atoms, phenyl or methylphenyl, A is oxazino, and R$_1$ is nitrophenyl, nitroxyphenyl, or trimethoxyphenyl; or its physiologically acceptable acid salts. The amides are useful for treating cardiac disturbances such as myocardial anoxia, coronary insufficiency, myocardial infarction, and arrhythmia.

---

This application is a division of copending application Ser. No. 842,388, filed July 16, 1969 and now issued as U.S. Pat. 3,663,566. This application claims the priority as perfected in the parent of the application filed in France on July 17, 1968.

This invention is concerned with certain novel amides, with a process for their preparation and with compositions containing them.

We have found that amides of the formula:

R—O—CH$_2$—CH—CH$_2$—A
        |
        NH—CO—R$_1$     (I)

in which R is an alkyl, alkenyl, alkynyl, aryl or arylalkyl radical, all of which may be unsubstituted or substituted, A is a tertiary amine group included in a heterocyclic group, and R$_1$ is an aromatic radical which may, if desired, be substituted in the nucleus, or an arylalkyl radical, and their addition salts with physiologically acceptable acids, have valuable cardic-vascular properties, and are suitable for therapeutic use.

The amides of Formula I and their acid addition salts are novel and constitute one aspect of the present invention.

The amides of Formula I can be prepared by a four stage process.

Stage 1: Conversion of an alcohol of the formula: R—O—CH$_2$—CHOH—CH$_2$—A, into the corresponding chloride by reaction with thionyl chloride in chloroform.

Stage 2: Treatment of the resulting chloro derivative with potassium phthalimide in dimethylformamide.

Stage 3: Conversion of the resulting phthalimide into an amine of the formula,

—O—CH$_2$—CHNH$_2$—CH$_2$—A by treatment with hydrazine in accordance with the process described by Ing and Manske (J. Chem. Soc., London, 1926: 2348).

Stage 4: Reaction of the resulting amine with an acid chloride of the formula, ClCOR$_1$, wherein R$_1$, is as defined above to obtain the desired final product.

The use of this process to prepare the compound in which R is

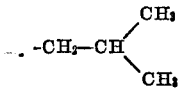

A is

and R$_1$ is

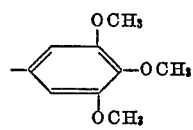

that is to say the compound 1-[3-isoamyloxy-2-(3,4,5-trimethoxy)benzoylamino] - propyl - tetrahydro-1,4-oxazine

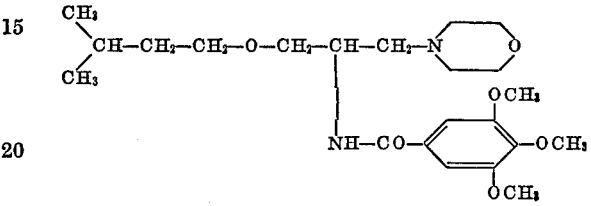

will now be described by way of example only.

EXAMPLE

First stage.—1-(3-isoamyloxy-2-chloro)-propyl-tetrahydro-1,4-oxazine

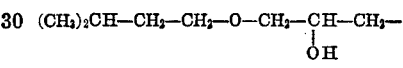

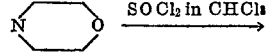

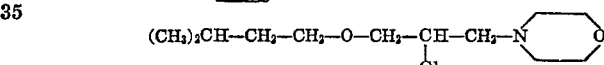

A solution of 180 g. of SOCl$_2$ in anhydrous CHCl$_3$ was added to a solution of 231 g. (1 M) of the aminoalcohol in 400 ml. of anhydrous CHCl$_3$ with thorough stirring and while limiting the rise in temperature to not more than 55° C.

After completion of the addition, the whole was refluxed for 4 hours and, after evaporation of the solvent, the residue was poured onto crushed ice and rendered alkaline by the addition of 33% aqueous NaOH. The product was extracted with ether and, after drying of the extract over anhydrous Na$_2$SO$_4$ and distillation of the solvent, it was distilled under vacuum to give 175 g. of a colorless liquid, B.P. 115° C; $n_D^{24}$=1.4625.

Second and third stages.—1-(3-isoamyloxy-2-amino)-propyl-tetrahydro-1,4-oxazine

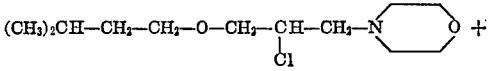

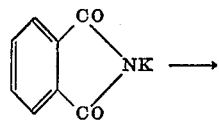

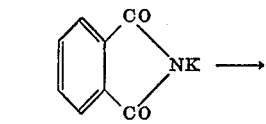

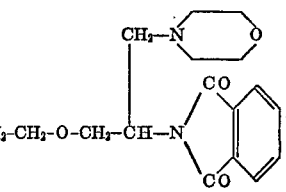

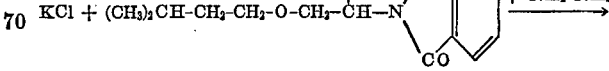

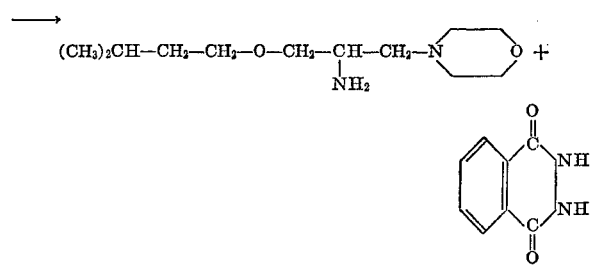

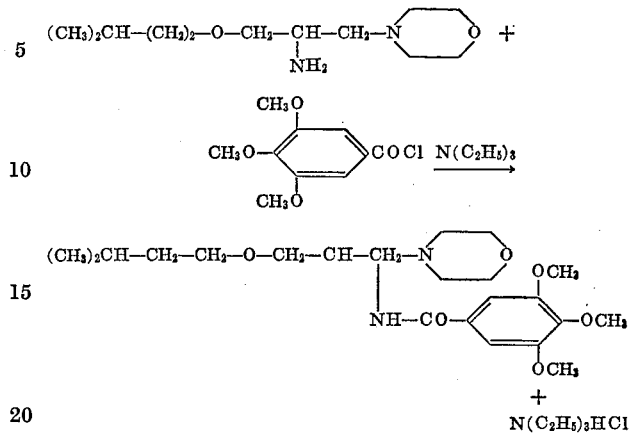

175 g. (0.7 M) of the halogen derivative obtained in Stage 1, 132 g. (0.8 M) of potassium phthalimide, and 300 ml. of dimethylformamide were heated together for 8 hours at 110° C. After cooling, the KCl precipitate was filtered off and washed with 100 ml. of dimethylformamide. The solvent was evacuated under vacuum and the residue, which did not crystallize was used in its crude state in the next stage.

500 ml. of ethanol at 95° C. and 39 g. of hydrazine hydrate were added to the residue and the whole was refluxed for 2 hours. The mixture was acidified with concentrated HCl. The phthalhydrazine precipitate was filtered off and washed with alcohol. The filtrate was concentrated to 100 ml. 500 ml. of water were added and, after filtration, this was concentrated to 200 ml. It was rendered alkaline with 40% NaOH and the oil formed was extracted with ether. Distillation under vacuum gave 95 g. of product, B.P. (3 mm. Hg) 127–131° G.

The product was then purified by crystallizing its difumarate from absolute alcohol and then recrystallizing from the same solvent.

After liberation of the base, the product was distilled again under vacuum and 63 g. of a chromatographically pure product were obtained, B.P. (3 mm. Hg) 129° C. $n_D^{24}=1.4650$.

Total yield of the two stages from the halogen derivative=39%.

Fourth stage.—1 - [3-isoamyloxy - 2 - (3,4,5-trimethoxy)-benzoyl - chloride amino] - propyl - tetrahydro - 1,4-oxazine 23 g. (0.1 M) of 3,4,5-trimethoxy-benzoyl chloride were added, with thorough stirring and at a temperature of 0° C., to a solution of 22.9 g. (0.1 M) of the previously prepared diamine in 100 ml. of chloroform. After the addition, the mixture was allowed to return to ambient temperature and then left to stand overnight.

The solvent was removed, the residue was taken up in ether, filtered and washed with water. This ether solution was dried over Na₂SO₄, filtered and the product was crystallized by cooling.

Recrystallization from anhydrous ether gave 30 g. of a crystalline product, M.P. 63–64° C. N calculated =6.60%. N found=6.57%. Yield=70%.

The fumarate of this base was also prepared. Table I shows the characteristics of this compound and of a number of other compounds of Formula I and their salts that have been prepared in an exactly analogous manner.

| Comp. No. | R | A | R₁ | Constants |
|---|---|---|---|---|
| 1 | (CH₃)₂CH—CH₂— | morpholino | 3,4,5-(CH₃O)₃—C₆H₂— | Base, M.W. 410, m.p. 87° C. Fumarate, M.W. 526, m.p. 117° C. |
| 2 | (CH₃)₂CH—CH₂—CH₂—CH₂— | Same as above | Same as above | Base, M.W. 424, m.p. 63–64° C. Fumarate, M.W. 540, m.p. 128° C. |
| 3 | C₆H₅—CH₂— | do | do | Base, M.W. 444, m.p. 85° C. Fumarate, M.W. 560, m.p. 110° C. |
| 4 | Same as above | do | O₂N—C₆H₄— | Base, M.W. 398, m.p. 70° C. Fumarate, M.W. 514, m.p. 140° C. |
| 5 | C₆H₅— | do | Same as above | Base, M.W. 385, m.p. 135° C. HCl, M.W. 421.5, m.p. 150° C. |
| 6 | Same as above | do | 3,4,5-(CH₃O)₃—C₆H₂— | Base, M.W. 432, m.p. 95° C. HCl, M.W. 468.5, m.p. 111° C. |
| 7 | do | do | pyridyl | Base, M.W. 341, m.p. 70° C. Di-HCl, 414, m.p. 140° C. |
| 8 | do | pyrrolidino | 3,4,5-(CH₃O)₃—C₆H₂— | Base, M.W. 414, noncrystalline. HCl, M.W. 450.5, m.p. 170° C. |
| 9 | do | Same as above | O₂N—C₆H₄— | Base, M.W. 369, noncrystalline. HCl, M.W. 405.5, m.p. 140° C. |

As indicated above, the compounds of Formula I and their salts have valuable pharmacodynamic properties.

First, their acute toxicity, evaluated by determining the $LD_{50}$ according to the conventional method of Behrens and Karber (Arch. f. exp. pharm., 177, 379 (1935)) is substantially the same as those of drugs known at the present time for the same purposes. Thus, the $LD_{50}$, in mg./kg., in the mouse when given orally, is as follows for some of the above-mentioned compounds and some known drugs:

| Compound No.: | $LD_{50}$ (mg./kg.) |
|---|---|
| 1 | 600 |
| 2 | 1000 |
| 3 | 2500 |
| 4 | 1175 |
| 8 | 460 |
| Lidocaine | 300 |
| Ajmaline | 440 |
| Propanol | 500 |

The $LD_{50}$ evaluated by the same method, but given intravenously, is 44 mg./kg. for Compound No. 8, while for Lidocaine, Ajmaline and Propanol, it is 32, 26 and 30 mg./kg. respectively.

Second, these compounds act generally on the coronary rate, arterial tension, the forces of the cardiac contractions and the coronary oxygen pressure, $pO_2$, these effects having been demonstrated for a number of the compounds using the following method of investigation.

The thorax of the test animal, a dog, was opened under chloralosis by resection of the fifth rib on the right side. A strain gauge was sewn onto the right ventricle. A catheter of the largest possible diameter was introduced into the coronary sinus through an opening in the right auricle and fixed by a ligature placed very near the auricle.

The coronary venous blood flowed into a rotameter placed in a thermostatically controlled vessel and then, in the same vessel, was brought into contact with an oxygen macroelectrode (Beckman). It returned to the right jugular by a duct penetrated by a fine catheter, which conveyed blood to a Technicon autoanalyzer in which the total carbon dioxide and ammonia were determined continuously. The contraction of the myocardium, the $D_2$ electrocardiogram, the integrated coronary rate, the arterial pressure and the $pO_2$ were recorded on a Beckman dynograph.

The products were administered venously (external saphenous vein) with as low injection taking 1 minute.

Results (average of a batch of five dogs)

| Compound No. | Dose, mg./kg. | Coronary rate | Frequency | Arterial pressure | Ventricular gauge | $pO_2$ |
|---|---|---|---|---|---|---|
| 1 | 5 | ↑32.4 | ↑12.6 | ↓5.5 | ↑5.9 | ↑26.6 |
| 2 | 5 | ↑38.6 | ↑4.9 | ↓6.5 | ↑6.6 | ↑29 |
| 3 | 5 | ↑13 | ↑3 | ↓9 | ↑10 | ↑4 |
| 4 | 5 | ↑20 | ↓13.5 | ↓13 | ↑2 | ↑26 |

These compounds as a whole have valuable antiarrhythmic properties, causing the disappearance of the extra systoles induced by a strong dose of adrenaline injected intravenously and reducing the excitability of the isolated auricle.

Compound No. 8 is remarkable in this respecst, showing an anti-arrhythmic activity that is greatly superior in all respects to that of drugs already known for this purpose.

The various aspects of these activities have been compared and the results are set out below, the index 100 being taken arbitrarily as a reference activity for each type of test for Compound No. 8.

(1) Arrhythmia caused by coronary ligature in a waking dog (Harris' method): Each value is the average of the results obtained from 10 animals.

A. INTRAVENOUS ADMINISTRATION 5 mg./kg.

| Products | Compound No. 8 | Ajmaline | Hydroquinidine | Lidocaine | Procainamide | Phenytoine | Propranolol |
|---|---|---|---|---|---|---|---|
| Activity (Ex. 8, index 100) | 100 | 40 | 40 | 95 | 15 | 20 | 65 |
| Duration of action (min.) | 10'17" | 8'40" | x | 8'07" | x | x | 17'15" |

B. ORAL ADMINISTRATION, 25 mg./kg.

| Products | Compound No. 8 | Ajmaline | Hydroquinidine | Propranolol | Lidocaine |
|---|---|---|---|---|---|
| Activity (Ex. 8, index 100) | 100 | 100 | 71 | 43 | 0 because of destruction |
| Start of action | 36 min. | 53 min. | 44 min. | 5 hrs. 30 min. | |
| Maximum duration of action | More than 8 hrs. | 6 hrs. 30 min. | More than 7 hrs. | | |

NOTE.—x activity insufficiently characteristic for its duration to be indicated.

(2) Arrhythmia caused by strong doses of ouabain in an anaesthetized dog.

(Intravenous injection of 80 µg. of ouabain in 1 minute causes very severe arrhythmia 15 to 25 minutes afterwards.)

INTRAVENOUS ADMINISTRATION, 1.25 mg./kg.

[Average of results from 10 animals]

| Products | Compound No. 8 | Lidocaine | Procainamide |
|---|---|---|---|
| Activity (Ex. 8, index 100) | 100 | 100 | 10 |
| Duration of action (min.) | 22 | 8 | x |

INTRAVENOUS ADMINISTRATION, 2.5 mg./kg.

[Average of results from 10 animals]

| Products | Compound No. 8 | Hydroquinidine | Lidocaine | Procainamide | Phenytine | Propranolol |
|---|---|---|---|---|---|---|
| Activity (Ex. 8, index 100) | 100 | 36 | 100 | 82 | 54 | 182 |
| Duration of action (min.) | 22 | x | 8 | x | x | 8 |

NOTE.—x activity insufficiently characteristic to indicate its duration.

On this type of arrhythmia, only Propanolol is more active than Compound No. 8, but the duration of action of Compound No. 8 is here distinctly greater than that of all the reference products.

Compound 8 is also distinguished by a valuable anaesthetic activity, as the following comparisons show.

Local anaesthetic action (and of other antiarrythmic drugs: Lidocaine, Procainamide).

Local conduction anaesthesia with intradermic administration in the guinea-pig (method of Bulbring and Wajda).

| Products | Percent of anaesthesia at 2% concentration | |
|---|---|---|
| | During the first 30 mins. | During the 24th hr. |
| Compound No. 8 | 98 | 100 |
| Lidocaine | 96 | 0 |

The activity of Compound No. 8 according to the concentration is comparable to that of Lidocaine, but its duration of action is much greater.

Activity as visceral analgesic (method of Koster in the mouse-oral administration)

Products:              $ED_{50}$ in mg./kg.
Compound No. 8 _____ 170.
Lidocaine _____ Without action.

The compounds of Formula I therefore appear to be suitable for the following therapeutic indications:

Myocardial anoxia
Coronary insufficiency, angina
Myocardial infarction
Cardiac insufficiency linked with disturbances of coronary circulation
Disturbances of rhythm Compound 8 is particularly advantageous for the latter indication.

These compounds may be administered orally, in the form of tablets, gelules, capsules, soluble granulates, drops or syrup; rectally, in the form of suppositories or rectal capsules, or by injection, in the form of bottles of lyophilized powder or ampoules. For this purpose the compounds are associated with inert, physiologically acceptable carriers appropriate to the intended mode of administration. Suitable doses for the various modes of administration are summarized in the following table.

| Mode of administration | Unit dose, mg. | Preferred dose, mg. |
|---|---|---|
| Oral | 50–100 | 75 |
| Injectable | 50–500 | 250 |
| Rectal | 100–200 | 100 |

What we claim is:

1. An amide of the formula:

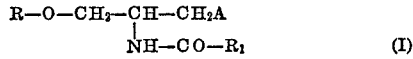

(I)

in which R is lower alkyl having up to 5 carbon atoms, phenyl or methylphenyl, A is oxazino, and $R_1$ is nitrophenyl, nitroxyphenyl, or trimethoxyphenyl; or physiologically acceptable acid salts of the amide.

2. 1-[3-isobutyloxy - 2 - (3,4,5 - trimethoxy)-benzoylamino]-propyl-tetrahydro-1,4-oxazine.

3. 1-[3-isoamyloxy - 2 - (3,4,5 - trimethoxy)-benzoylamino]-propyl-tetrahydro-1,4-oxazine.

4. 1-[3-benzyloxy - 2 - (3,4,5 - trimethoxy) - benzoylamino]-propyl-tetrahydro-1,4-oxazine.

5. 1-[3-benzyloxy - 2 - (4-nitro)-benzylamino]-propyl-tetrahydro-1,4-oxazine.

6. 1-[3-phenoxy - 2 - (4-nitro)-benzoylamino]-propyl-tetrahydro-1,4-oxazine.

7. 1-[3-phenoxy - 2 - (3,4,5-trimethoxy)-benzylamino]-propyl-tetrahydro-1,4-oxazine.

8. 1-(3-phenoxy - 2 - nicotinoylamino)-propyl-tetrahydro-1,4-oxazine.

References Cited

UNITED STATES PATENTS 3,723,416    3/1973    Thominet _____ 260—239 BF

HENRY R. JILES, Primary Examiner

G. T. TODD, Assistant Examiner

U.S. Cl. X.R.

260—295.5 A